US011112363B2

(12) United States Patent
Lee et al.

(10) Patent No.: US 11,112,363 B2
(45) Date of Patent: Sep. 7, 2021

(54) APPARATUS AND METHOD FOR MEASURING PARTICULATE MATTER

(71) Applicant: SAMSUNG ELECTRONICS CO., LTD., Suwon-si (KR)

(72) Inventors: Woo Chang Lee, Anyang-si (KR); Yun S Park, Suwon-si (KR); Ho Jun Chang, Seoul (KR); Sung Hyun Nam, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/819,618

(22) Filed: Mar. 16, 2020

(65) Prior Publication Data
US 2021/0041365 A1 Feb. 11, 2021

(30) Foreign Application Priority Data
Aug. 5, 2019 (KR) .................. 10-2019-0094822

(51) Int. Cl.
G01N 21/65 (2006.01)
G01N 21/03 (2006.01)
G01J 3/44 (2006.01)
G01N 15/02 (2006.01)
G01N 15/00 (2006.01)
G01N 15/06 (2006.01)

(52) U.S. Cl.
CPC .................... G01N 21/65 (2013.01)

(58) Field of Classification Search
CPC .............. G01J 3/44; G01N 15/0227; G01N 2015/0026; G01N 2015/0046; G01N 21/031; G01N 21/65; G01N 2201/08
See application file for complete search history.

(56) References Cited

U.S. PATENT DOCUMENTS 4,786,472 A 11/1988 McConnell et al.
5,510,611 A 4/1996 Takahara et al.
(Continued)

FOREIGN PATENT DOCUMENTS

CN 106404616 A 2/2017
CN 108153186 A 6/2018
(Continued)

OTHER PUBLICATIONS

"Air quality monitoring using mobile microscopy and machine learning", Light, Sci. & App. (6), pp. 1-12, 2017 (Year: 2017).*
(Continued)

Primary Examiner — Hina F Ayub
(74) Attorney, Agent, or Firm — Sughrue Mion, PLLC

(57) ABSTRACT

Provided is an apparatus for measuring particulate matter including an image obtaining device configured to charge particulate matter particles included in air that is introduced to the image obtaining device, and to obtain an image of the charged particulate matter particles based on lens-free imaging, a spectrum obtaining device configured to obtain a Raman spectrum of the charged particulate matter particles, and a processor configured to determine a size of the particulate matter particles and a concentration of the particulate matter particles based on the obtained image, and to determine components of the particulate matter particles based on the obtained Raman spectrum.

20 Claims, 6 Drawing Sheets

(56) References Cited

U.S. PATENT DOCUMENTS

| | | | |
|---|---|---|---|
| 7,275,453 | B2 | 10/2007 | Ishikawa et al. |
| 8,009,290 | B2 | 8/2011 | Unger |
| 8,405,033 | B2 | 3/2013 | Debreczeny |
| 9,417,173 | B2 | 8/2016 | Nitta |
| 9,921,144 | B2 | 3/2018 | Cole et al. |
| 2018/0136114 | A1* | 5/2018 | Delattre ............. G01N 15/1434 |
| 2018/0260610 | A1 | 9/2018 | Jadhav et al. |
| 2019/0346356 | A1 | 11/2019 | Karnik et al. |

FOREIGN PATENT DOCUMENTS

| | | |
|---|---|---|
| EP | 1 517 129 A2 | 3/2005 |
| EP | 1 574 836 A1 | 9/2005 |
| JP | 7-198581 A | 8/1995 |
| JP | 2008-111757 A | 5/2008 |
| KR | 10-1551289 B1 | 9/2015 |
| KR | 10-1678175 B1 | 11/2016 |
| KR | 10-1721607 B1 | 4/2017 |
| KR | 10-1914971 B1 | 11/2018 |
| WO | 2017/051327 A1 | 3/2017 |
| WO | 2018/118934 A1 | 6/2018 |

OTHER PUBLICATIONS

Hammond, Adam et al., "Holographic defection imaging measurement of electric charge on aerosol particles", Experiments in Fluids, May 27, 2019, vol. 60, No. 6, XP055750899. (16 pages total).

Wright, Stephanie L. et al., "Raman Spectral Imaging for the Detection of Inhalable Microplastics in Ambient Particulate Matter Samples", Environmental Science & Technology, Jul. 11, 2019, vol. 53, No. 15, pp. 8947-8956, XP055745800.

Sivaprakasam, Vasanthi et al., "Surface Enhanced Raman Spectroscopy of Individual Suspended Aerosol Particles", The Journal of Physical Chemistry C, Sep. 29, 2017, vol. 121, No. 40, pp. 22326-22334, XP055751076.

Communication dated Nov. 26, 2020 by the European Patent Office in counterpart European Patent Application No. 20174912.4.

* cited by examiner

Apparatus and Method for Measuring Particulate Matter

CROSS-REFERENCE TO RELATED APPLICATION

This application claims priority from Korean Patent Application No. 10-2019-0094822, filed on Aug. 5, 2019 in the Korean Intellectual Property Office, the entire disclosure of which is incorporated herein by reference.

BACKGROUND

1. Field

Example embodiments of the present disclosure relate to technology for measuring particulate matter.

2. Description of the Related Art

Particulate matter may include very small particles and liquid droplets suspended in the air, which are so small such that they are not visible to the eye, including particles having a diameter of 10 μm or less. Such particulate matter may be emitted from combustion of fossil fuels, such as coal, oil, and the like, or exhaust gases from cars, factories, and the like.

Recently, particulate matter has become a serious threat to both human health and the environment. Long-time exposure to particulate matter can lead to a significant decrease in the level of immunity, causing various health problems including respiratory diseases, such as cold, asthma, bronchitis, and the like, as well as cardiovascular diseases, skin diseases, eye problems, and the like. Particularly, fine particulate matter having a diameter of 2.5 μm or less tends to penetrate deep into the lungs and the bronchial tubes in the body, and sticks to the lungs and the bronchial tubes which may cause various diseases.

Accordingly, there is a need to develop techniques for users to easily measure the quality of ambient air.

SUMMARY

One or more example embodiments provide an apparatus and method for measuring the size, concentration, and components of particulate matter particles at the same time.

According to an aspect of an example embodiment, there is provided an apparatus for measuring particulate matter, the apparatus including an image obtaining device configured to charge particulate matter particles included in air that is introduced to the image obtaining device, and to obtain an image of the charged particulate matter particles based on lens-free imaging, a spectrum obtaining device configured to obtain a Raman spectrum of the charged particulate matter particles, and a processor configured to determine a size of the particulate matter particles and a concentration of the particulate matter particles based on the obtained image, and to determine components of the particulate matter particles based on the obtained Raman spectrum.

The image obtaining device may include a particulate matter adsorbing device configured to charge the particulate matter particles and to adsorb the charged particulate matter particles, a light source configured to emit light to the adsorbed particulate matter particles, and an image generating device configured to generate an image of the particulate matter particles by receiving light having passed through the adsorbed particulate matter particles, light reflected from the adsorbed particulate matter particles, or light scattered from the adsorbed particulate matter particles.

The particulate matter adsorbing device may include a first electrode to which one of a positive polarity or a negative polarity is applied and configured to charge the particulate matter particles, and a second electrode to which the other one of the positive polarity and the negative polarity is applied and configured to adsorb the charged particulate matter particles.

The second electrode may have a plate shape.

The second electrode may be formed of one of indium tin oxide (ITO), indium zinc oxide (IZO), SnO2, zinc oxide (ZnO), graphene, silver nanowire, conductive polymer (e.g., PEDOT:PSS), and carbon nanotube.

The image generating device may include at least one of a charge-coupled device (CCD) and a complementary metal oxide semiconductor (CMOS).

The spectrum obtaining device may include a waveguide into which the charged particulate matter particles are introduced, a light source configured to emit light to the charged particulate matter particles introduced into the waveguide, and a spectrum generating device configured to generate the Raman spectrum of the charged particulate matter particles by receiving Raman scattered light of the charged particulate matter particles introduced into the waveguide.

The waveguide may be configured to discharge the charged particulate matter particles to an outside of the apparatus for measuring particulate matter.

The light source may be disposed proximate to an inlet of the waveguide, and the spectrum generating device is disposed proximate to an outlet of the waveguide.

The spectrum generating device may include a spectrometer configured to separate the Raman scattered light into light of different wavelengths, and a generating device configured to obtain the Raman spectrum by receiving the Raman scattered light which is separated into the light of different wavelengths.

The spectrometer may include at least one of a prism, a grating, and a filter.

The generating device may include at least one of a charge-coupled device (CCD) and a complementary metal oxide semiconductor (CMOS).

According to another aspect of an example embodiment, there is provided a method of measuring particulate matter, the method including charging particulate matter particles included in air, obtaining an image of the charged particulate matter particles based on lens-free imaging, obtaining a Raman spectrum of the charged particulate matter particles, determining a size of the particulate matter particles and a concentration of the particulate matter particles based on the obtained image, and determining components of the particulate matter particles based on the obtained Raman spectrum.

The obtaining of the image may include adsorbing the charged particulate matter particles, emitting light to the adsorbed particulate matter particles, and generating an image of the particulate matter particles by receiving light having passed through the adsorbed particulate matter particles, light reflected from the adsorbed particulate matter particles, or light scattered from the adsorbed particulate matter particles.

The Raman spectrum may include emitting light to the charged particulate matter particles introduced into the waveguide, and generating a Raman spectrum of the charged particulate matter particles by receiving Raman scattered light of the charged particulate matter particles introduced into the waveguide.

According to another aspect of an example embodiment, there is provided an apparatus for measuring particulate matter, the apparatus including an image obtaining device configured to charge particulate matter particles included in air that is introduced to the image obtaining device, and to obtain an image of the charged particulate matter particles based on lens-free imaging, a waveguide into which the charged particulate matter particles are introduced, a spectrum obtaining device configured to obtain a Raman spectrum of the charged particulate matter particles by receiving the Raman scattered light of the charged particulate matter particles introduced into the waveguide, and a processor configured to determine a size of the particulate matter particles and a concentration of the particulate matter particles based on the obtained image, and to determine components of the particulate matter particles based on the obtained Raman spectrum.

The spectrum obtaining device may further include a light source configured to emit light to the charged particulate matter particles introduced into the waveguide.

The spectrum obtaining device may further include a spectrometer configured to separate the Raman scattered light into light of different wavelengths, and a generating device configured to obtain the Raman spectrum by receiving the Raman scattered light which is separated into the light of different wavelengths.

The image obtaining device may include a particulate matter adsorbing device configured to charge the particulate matter particles and to adsorb the charged particulate matter particles, a light source configured to emit light to the adsorbed particulate matter particles, and an image generating device configured to generate an image of the particulate matter particles by receiving light having passed through the adsorbed particulate matter particles, light reflected from the adsorbed particulate matter particles, or light scattered from the adsorbed particulate matter particles.

The particulate matter adsorbing device may include a first electrode to which one of a positive polarity or a negative polarity is applied and configured to charge the particulate matter particles, and a second electrode to which the other one of the positive polarity and the negative polarity is applied and configured to adsorb the charged particulate matter particles

BRIEF DESCRIPTION OF THE DRAWINGS

The above and/or other aspects, features, and advantages of certain example embodiments will be more apparent from the following description taken in conjunction with the accompanying drawings, in which.

DETAILED DESCRIPTION

Figure 1:
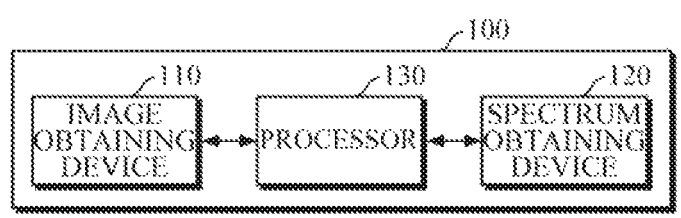
FIG. 1 is a block diagram illustrating an apparatus for measuring particulate matter according to an example embodiment.

Hereinafter, example embodiments of the present disclosure will be described in detail with reference to the accompanying drawings. Throughout the drawings and the detailed description, unless otherwise described, the same drawing reference numerals will be understood to refer to the same elements, features, and structures. The relative size and depiction of these elements may be exaggerated for clarity, illustration, and convenience. It should be noted that wherever possible, the same reference symbols refer to same parts even in different drawings. In the following description, a detailed description of known functions and configurations incorporated herein will be omitted when it may obscure the subject matter of the present invention.

Process steps described herein may be performed differently from a specified order, unless a specified order is clearly stated in the context of the disclosure. That is, each step may be performed in a specified order, at substantially the same time, or in a reverse order.

Further, the terms used throughout this specification are defined in consideration of the functions according to example embodiments, and can be varied according to a purpose of a user or manager, or precedent and so on. Therefore, definitions of the terms should be made on the basis of the overall context.

It will be understood that, although the terms first, second, etc. may be used herein to describe various elements, these elements should not be limited by these terms. These terms are only used to distinguish one element from another. Any references to singular may include plural unless expressly stated otherwise. It should be understood that the terms, such as 'including' or 'having,' etc., are intended to indicate the existence of the features, numbers, steps, actions, components, parts, or combinations thereof disclosed in the specification, and are not intended to preclude the possibility that one or more other features, numbers, steps, actions, components, parts, or combinations thereof may exist or may be added. As used herein, the term "and/or" includes any and all combinations of one or more of the associated listed items. Expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, or all of a, b, and c.

Further, components that will be described in the specification are discriminated merely according to functions mainly performed by the components. That is, two or more components which will be described later can be integrated into a single component. Furthermore, a single component which will be explained later can be separated into two or more components. Moreover, each component can additionally perform some or all of a function executed by another component in addition to the main function thereof. Some or all of the main function of each component can be carried out by another component. Each component may be implemented as hardware, software, or a combination of both.

Figure 2:
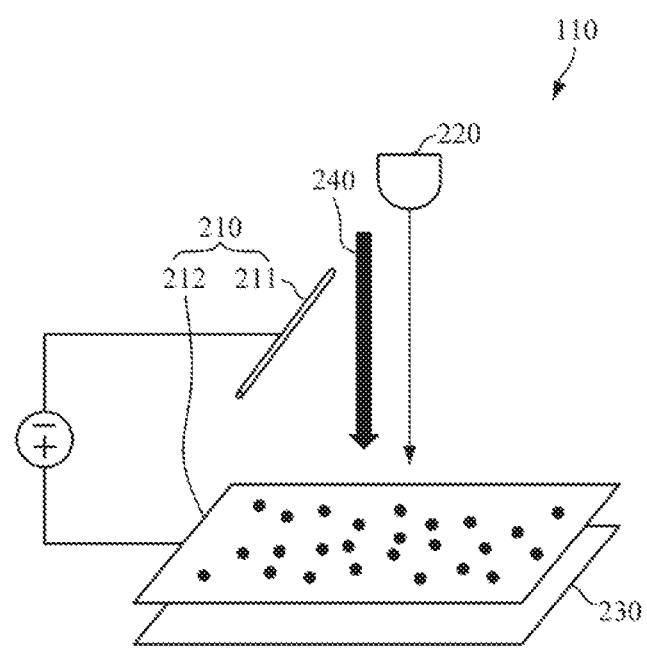
FIG. 2 is a diagram illustrating a structure of an image obtaining device according to an example embodiment.
Figure 3:
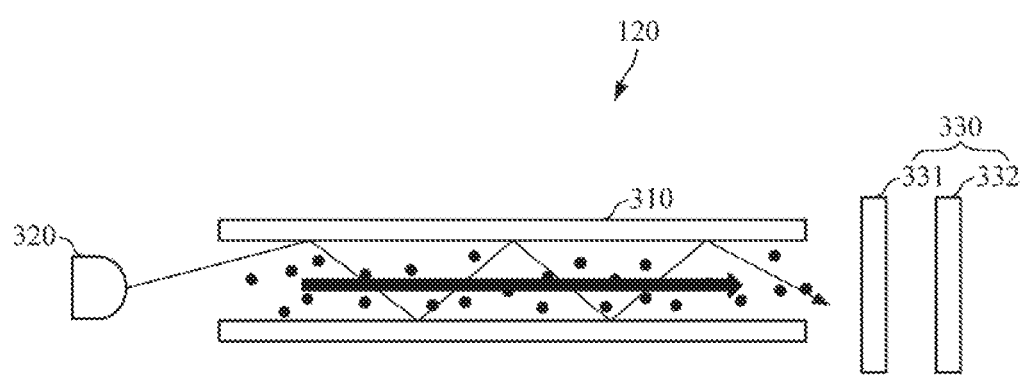
FIG. 3 is a diagram illustrating a structure of a spectrum obtainer according to an example embodiment.

FIG. 1 is a block diagram illustrating an apparatus for measuring particulate matter according to an example embodiment, FIG. 2 is a diagram illustrating a structure of an image obtaining device according to an example embodiment, and FIG. 3 is a diagram illustrating a structure of a spectrum obtainer according to an example embodiment.

Referring to FIGS. 1 to 3, the apparatus 100 for measuring particulate matter includes an image obtaining device 110, a spectrum obtaining device 120, and a processor 130.

When air containing particulate matter is introduced into the apparatus 100 for measuring particulate matter, the image obtaining device 110 may obtain an image of particulate matter particles, contained in the introduced air, using lens-free imaging. For example, the image obtaining device 110 may charge the particulate matter particles contained the introduced air, and may adsorb the charged particulate matter particles contained in the introduced air. Further, the image obtaining device 110 may emit light to the adsorbed particulate matter particles, and may generate an image of the particulate matter particles by receiving light having passed through the particulate matter particles or light reflected or scattered from the particulate matter particles.

As illustrated in FIG. 2, the image obtaining device 110 includes a particulate matter adsorbing device 210, a light source 220, and an image generating device 230.

The particulate matter adsorbing device 210 may charge the particulate matter particles, and may adsorb the charged particulate matter particles. The particulate matter adsorbing device 210 may include a first electrode 211, to which either one of a positive polarity or a negative polarity is applied to charge the particulate matter particles, and a second electrode 212, to which the other one of the positive polarity and the negative polarity is applied to adsorb the charged particulate matter particles.

Once power is applied to the first electrode 211 and the second electrode 212, an electric field may be generated between the first electrode 211 and the second electrode 212. If the particulate matter particles flow in a direction 240 from the first electrode 211 to the second electrode 212, the particulate matter particles may be electrically charged while passing through the first electrode 211. In this case, when the polarity, applied to the first electrode 211, is a positive polarity, the particulate matter particles are positively (+) charged, and when the polarity, applied to the first electrode 211, is a negative polarity, the particulate matter particles are negatively (−) charged. The charged particulate matter particles may be adsorbed on the second electrode 212. A polarity, applied to the second electrode 212, is opposite to a polarity applied to the first electrode 211, such that the second electrode 212 may have electrical properties which are opposite to those of the charged particulate matter particles. Accordingly, the particulate matter particles, which are electrically charged while passing through the first electrode 211, may be adsorbed automatically on the second electrode 212.

In an example embodiment, the first electrode 211 may have a bar shape as illustrated in FIG. 2. However, the first electrode 211 is not limited thereto, and may have various shapes, such as a plate shape having holes such that air containing particulate matter particles may pass therethrough, a grid shape, and the like. Further, as illustrated in FIG. 2, the second electrode 212 may have a plate shape, such that the charged particulate matter particles may be adsorbed thereon.

In an example embodiment, the first electrode 211 and the second electrode 212 may be formed as a transparent electrode, to not obstruct the passage of light. For example, the first electrode 211 and the second electrode 212 may be made of indium tin oxide (ITO), indium zinc oxide (IZO), stannic oxide ($SnO_2$), zinc oxide (ZnO), graphene, silver nanowire, conductive polymer (e.g., PEDOT:PSS), carbon nanotube, and the like.

While FIG. 2 illustrates two electrodes 211 and 212, this is merely an example, and the number of electrodes is not limited thereto.

The light source 220 may emit light to the particulate matter particles adsorbed on the second electrode 212. To this end, the light source 220 may include one or more light sources. For example, each light source may emit light of a predetermined wavelength, for example, visible light, near-infrared light, mid-infrared light, and the like, to the particulate matter particles adsorbed on the second electrode 212. However, wavelengths of light emitted by each light source may vary depending on the measurement purpose or types of analytes. Further, each light source is not necessarily formed of a single light-emitting body, and may be formed of an array of a plurality of light-emitting bodies. If each light source is formed of a plurality of light-emitting bodies, the plurality of light-emitting bodies may emit light of the same wavelength or light of different wavelengths. In addition, some of the plurality of light-emitting bodies may emit light of the same wavelength, and others may emit light of different wavelengths. In an example embodiment, each light source may include a light emitting diode (LED), a laser diode, a phosphor, and the like, but this is merely an example, and the light source is not limited thereto.

In an example embodiment, the light source 220 may further include a filter, for example, a clean-up filter, a bandpass filter, and the like, for selecting light of a specific wavelength, and/or an optical element, for example, reflecting mirror, and the like, for directing the emitted light toward a desired position.

The image generating device 230 may generate an image of the particulate matter particles by receiving light, having passed through the particulate matter particles adsorbed on the second electrode 212, or light reflected or scattered from the particulate matter particles adsorbed on the second electrode 212. In an example embodiment, the image generating device 230 may generate a hologram image of the particulate matter particles by receiving light having passed through, or reflected or scattered from, the particulate matter particles adsorbed on the second electrode 212, and may reconstruct the hologram image based on scattering characteristics of the particulate matter particles. In this case, the image generating device 230 may improve the resolution of the image by using a machine learning algorithm such as deep learning, and the like.

The image generating device 230 may be disposed below the second electrode 212. For example, the image generating device 230 may be disposed adjacent to a bottom portion of the second electrode 212. The image generating device 230 may include at least one of a charge-coupled device (CCD) and a complementary metal oxide semiconductor (CMOS).

The spectrum obtaining device 120 may obtain a Raman spectrum of the particulate matter particles contained in the introduced air. For example, the spectrum obtaining device 120 may emit light to the particulate matter particles contained in the introduced air, and may generate a Raman spectrum of the particulate matter particles by receiving Raman scattered light of the particulate matter particles.

As illustrated in FIG. 3, the spectrum obtaining device 120 may include a waveguide 310, a light source 320, and a spectrum generating device 330.

The particulate matter particles are introduced into the waveguide 310, and the waveguide 310 may transmit Raman scattered light of the particulate matter particles, which is produced by light emitted by the light source 320, to the spectrum generating device 330. The waveguide 310 may be formed as a hollow conduit having a relatively high conductivity.

In addition, the particulate matter particles may flow from an inlet of the waveguide 310 to an outlet thereof, and may be discharged to the outside from the outlet of the waveguide 310.

Once the particulate matter particles are introduced into the waveguide 310, the light source 320 may emit light to the particulate matter particles introduced into the waveguide 310. To this end, the light source 320 may include one or more light sources. For example, each light source may emit light of a predetermined wavelength, for example, visible light, near-infrared light, mid-infrared light, and the like, to the particulate matter particles introduced into the waveguide 310. However, wavelengths of light emitted by each light source may vary depending on the measurement purpose or types of analytes. Further, each light source is not necessarily formed of a single light-emitting body, and may be formed of an array of a plurality of light-emitting bodies. If each light source is formed of a plurality of light-emitting bodies, the plurality of light-emitting bodies may emit light of the same wavelength or light of different wavelengths. In addition, some of the plurality of light-emitting bodies may emit light of the same wavelength, and others may emit light of different wavelengths. In an example embodiment, each light source may include a light emitting diode (LED), a laser diode, a phosphor, and the like, but this is merely an example, and the light source is not limited thereto.

In an example embodiment, the light source 320 may further include a filter, for example, a clean-up filter, a bandpass filter, and the like, for selecting light of a specific wavelength, and/or an optical element, for example, reflecting mirror, and the like, for directing the emitted light toward a desired position.

The spectrum generating device 330 may generate a Raman spectrum of the particulate matter particles by receiving the Raman scattered light of the particulate matter particles introduced into the waveguide 310. To this end, the spectrum generating device 330 may include a spectrometer 331 and a generating device 332.

The spectrometer 331 may receive the Raman scattered light of the particulate matter particles introduced into the waveguide 310, and may separate the Raman scattered light into wavelengths. In an example embodiment, the spectrometer 331 may include at least one of a prism, a grating, a filter, and the like, but is not limited thereto.

The generating device 332 may generate a Raman spectrum by receiving the Raman scattered light which is separated into wavelengths. In an example embodiment, the generating device 332 may include at least one a charge-coupled device (CCD) and a complementary metal oxide semiconductor (CMOS), but is not limited thereto.

The processor 130 may control the overall operation of the apparatus 100 for measuring particulate matter.

Once air containing particulate matter particles is introduced, the processor 130 may control the image obtaining device 110 to obtain an image of the particulate matter particles, and may control the spectrum obtaining device 120 to obtain a Raman spectrum of the particulate matter particles.

The processor 130 may obtain information on the particulate matter particles by analyzing the obtained image and the obtained Raman spectrum of the particulate matter particles. In this case, the information on the particulate matter particles may include the size, concentration, components, and the like of the particulate matter particles.

In an example embodiment, the processor 130 may determine the size and concentration of the particulate matter particles by analyzing the image of the particulate matter particles. For example, by determining the size and number of the particulate matter particles in the image of the particulate matter particles, the processor 130 may determine the size and concentration of the particulate matter particles contained in the introduced air.

In an example embodiment, the processor 130 may determine the components of the particulate matter particles by analyzing the Raman spectrum of the particulate matter particles. A frequency, at which a Raman spectrum peak appears, may vary depending on the components of the particles. Accordingly, by referring to information on the frequency, at which the Raman spectrum peak appears, for each component of the particles, the processor 130 may determine the components of the particulate matter particles. In this case, information on the frequency, at which the Raman spectrum peak appears, for each component of the particles may be derived experimentally, and may be stored in an internal or external memory of the processor 130.

In addition, before determining the components of the particulate matter particles by analyzing the Raman spectrum thereof, the processor 130 may remove noise from the Raman spectrum. The Raman spectrum of the particulate matter particles includes much noise, and the noise included in the Raman spectrum may be divided into simple additive noise derived from an external environment, and background noise derived from autofluorescence. The processor 130 may remove the simple additive noise from the Raman spectrum by using a low-pass filter, for example, moving average filter, and the like. Further, the processor 130 may estimate a baseline of the Raman spectrum, and may remove the background noise by subtracting the estimated baseline from the Raman spectrum. In this case, the baseline may be estimated using a first-order differential method, a rolling-ball method, and the like. Here, the first-order differential method uses characteristics of background noise exhibiting a gradual change over the entire range. In the first-order differential method, a baseline is estimated by differentiating a spectrum, finding a significant peak, cutting out the corresponding peak area, and performing interpolation. Further, in the rolling-ball method, a trace of a highest point of a hypothetical ball that rolls underneath a spectrum is considered as a baseline.

Figure 4:
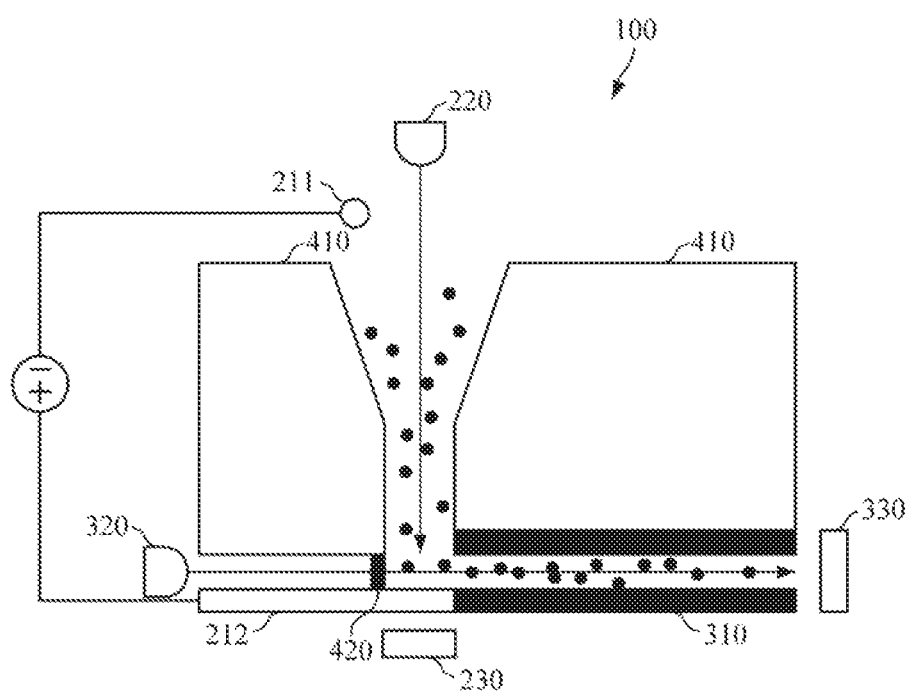
FIG. 4 is a diagram illustrating a structure of an apparatus for measuring particulate matter according to an example embodiment.

FIG. 4 is a diagram illustrating a structure of an apparatus for measuring particulate matter according to an example embodiment. The apparatus for measuring particulate matter of FIG. 4 may be an example of the structure of the apparatus 100 for measuring particulate matter of FIG. 1.

Referring to FIG. 4, a first electrode 211 is disposed near an inlet of a structure 410, into which air is introduced, and the second electrode 212 may be disposed below the structure 410. When power is applied to the first electrode 211 and the second electrode 212 and an electric field is generated therebetween, the particulate matter particles, contained in the introduced air, may be electrically charged while passing through the first electrode 211. The charge particulate matter may flow downwards along the generated electric field and a passage of the structure 410, to be adsorbed on the second electrode 212.

The light source 220 may be disposed near the inlet of the structure 410 to emit light to the particulate matter particles, which are adsorbed on the second electrode 212 disposed below the structure 410, and the image generating device 230 is dispose below the second electrode 212, and generates an image of the particulate matter particles by receiving light having passed through the second electrode 212.

The waveguide 310 is disposed below the structure 410 in a direction parallel to the second electrode 212. Once the image of the particulate matter particles is obtained, and the electric field generated between the first electrode 211 and the second electrode 212 is removed, the particulate matter particles adsorbed on the second electrode 212 are desorbed to be introduced into the waveguide 310, and then may flow along the waveguide 310 to be discharged to the outside. That is, the waveguide 310 may function as a discharge port for the particulate matter particles.

The light source 320 may be disposed near the inlet of the waveguide 310 to emit light to the particulate matter particles introduced into the waveguide 310, and the spectrum generating device 330 is disposed near an outlet of the waveguide 310 to receive Raman scattered light of the particulate matter particles, and may generate a Raman spectrum of the particulate matter particles.

In addition, in order to prevent or reduce the particulate matter particles, desorbed from the second electrode 212, from flowing in a direction other than the waveguide 330, the apparatus 100 for measuring particulate matter may include a blocking part 420 for blocking holes except for the inlet of the waveguide 310. The blocking part 420 may be made of a transparent material so as not to affect the passage of light, or may be formed as a filter for passing light of a predetermined wavelength.

Figure 5:
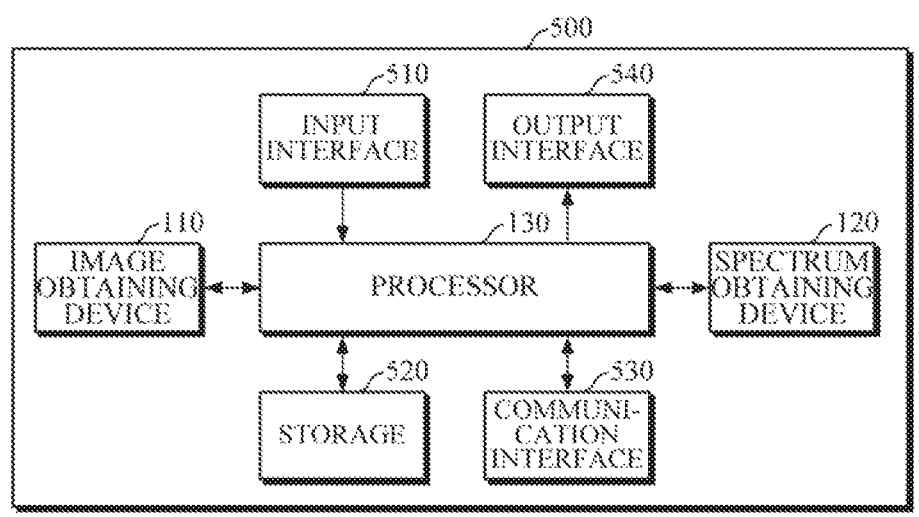
FIG. 5 is a block diagram illustrating an apparatus for measuring particulate matter according to another example embodiment.

FIG. 5 is a block diagram illustrating an apparatus for measuring particulate matter according to another embodiment of the present disclosure.

Referring to FIG. 5, the apparatus 500 for measuring particulate matter according to another embodiment of the present disclosure includes the image obtaining device 110, the spectrum obtaining device 120, the processor 130, an input interface 510, a storage 520, a communication interface 530, and an output interface 540. Here, the image obtaining device 110, the spectrum obtaining device 120, and the processor 130 are described above with reference to FIGS. 1 to 4, such that detailed description thereof will be omitted.

The input interface 510 may receive input of various operation signals from a user. In an example embodiment, the input interface 510 may include a keypad, a dome switch, a static pressure or capacitance touch pad, a jog wheel, a jog switch, a hardware (H/W) button, and the like. The touch pad, which forms a layer structure with a display, may be a touch screen.

The storage 520 may store programs or commands for operation of the apparatus 500 for measuring particulate matter, and may store data input to and processed by the apparatus 500 for measuring particulate matter. Further, the storage 520 may store image data obtained by the image obtaining device 110, Raman spectrum data obtained by the spectrum obtaining device 120, information on particulate matter particles determined by the processor 130, data required for the processor 130 to determine the information on particulate matter particles, for example, information on a frequency, at which a Raman spectrum peak appears, for each component of the particles, and the like.

The storage 520 may include at least one storage medium of a flash memory type memory, a hard disk type memory, a multimedia card micro type memory, a card type memory (e.g., an SD memory, an XD memory, etc.), a random access memory (RAM), a static random access memory (SRAM), a read only memory (ROM), an electrically erasable programmable read only memory (EEPROM), a programmable read only memory (PROM), a magnetic memory, a magnetic disk, and an optical disk, and the like. Further, the apparatus 500 for measuring particulate matter may operate an external storage medium, such as web storage and the like, which performs a storage function of the storage 520 on the Internet.

The communication interface 530 may communicate with an external device. For example, the communication interface 530 may transmit, to the external device, data input from a user through the input interface 510, the image data obtained by the image obtaining device 110, the Raman spectrum data obtained by the spectrum obtaining device 120, the information on particulate matter particles determined by the processor 130, the data required for the processor 130 to determine the information on particulate matter particles, for example, information on a frequency, at which a Raman spectrum peak appears, for each component of the particles, and the like; or may receive, from the external device, various data useful for determining the information on particulate matter particles.

In this case, the external device may be equipment using the image data obtained by the image obtaining device 110, the Raman spectrum data obtained by the spectrum obtaining device 120, the information on particulate matter particles determined by the processor 130, the data required for the processor 130 to determine the information on particulate matter particles, for example, information on a frequency, at which a Raman spectrum peak appears, for each component of the particles, and the like, a printer to print out results, or a display to display the results. In addition, the external device may be a digital television (TV), a desktop computer, a cellular phone, a smartphone, a tablet personal computer (PC), a laptop computer, a personal digital assistant (PDA), a portable multimedia player (PMP), a navigation device, an MP3 player, a digital camera, a wearable device, and the like, but is not limited thereto.

The communication interface 530 may communicate with an external device by using Bluetooth communication, Bluetooth Low Energy (BLE) communication, near field communication (NFC), WLAN communication, Zigbee communication, infrared data association (IrDA) communication, Wi-Fi Direct (WFD) communication, ultra-wideband (UWB) communication, Ant+ communication, WIFI communication, radio frequency identification (RFID) communication, 3G communication, 4G communication, 5G communication, and the like. However, embodiments are not limited thereto.

The output interface 540 may output the image data obtained by the image obtaining device 110, the Raman spectrum data obtained by the spectrum obtaining device 120, the information on particulate matter particles determined by the processor 130, the data required for the processor 130 to determine the information on particulate matter particles, for example, information on a frequency, at which a Raman spectrum peak appears, for each component of the particles, and the like. In an example embodiment, the output interface 540 may output the image data obtained by the image obtaining device 110, the Raman spectrum data obtained by the spectrum obtaining device 120, the information on particulate matter particles determined by the processor 130, the data required for the processor 130 to determine the information on particulate matter particles, for example, information on a frequency, at which a Raman spectrum peak appears, for each component of the particles, and the like by using at least one of an acoustic method, a visual method, and a tactile method. To this end, the output interface 540 may include a display, a speaker, a vibrator, and the like.

Figure 6:
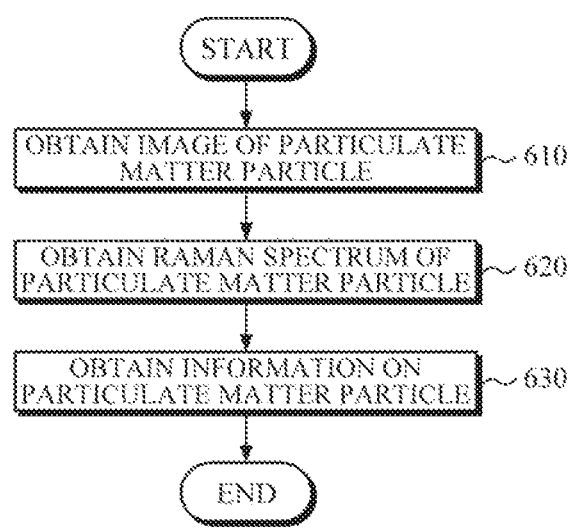
FIG. 6 is a flowchart illustrating a method of measuring particulate matter according to an example embodiment.

FIG. 6 is a flowchart illustrating a method of measuring particulate matter according to an example embodiment. The method of measuring particulate matter of FIG. 6 may be performed by the apparatus 100 or 500 for measuring particulate matter of FIG. 1 or FIG. 5.

Referring to FIG. 6, the apparatus for measuring particulate matter may obtain an image of particulate matter particles, contained in the introduced air, using lens-free imaging (610). For example, the apparatus for measuring particulate matter may charge the particulate matter particles contained in the introduced air, and may adsorb the charged particulate matter particles. Further, the apparatus for measuring particulate matter may emit light to the adsorbed particulate matter particles, and may generate an image of the particulate matter particles by receiving light having passed through, or reflected or scattered from, the particulate matter particles.

By applying power to the first electrode and the second electrode, the apparatus for measuring particulate matter may generate an electric field between the first electrode and the second electrode. The particulate matter particles may be electrically charged while passing through the first electrode, and the charged particulate matter particles may be adsorbed on the second electrode. The apparatus for measuring particulate matter may emit light to the particulate matter particles adsorbed on the second electrode, and may generate an image of the particulate matter particles by receiving light having passed through the particulate matter particles or light reflected or scattered from the particulate matter particles. For example, the apparatus for measuring particulate matter may generate a hologram image of the particulate matter particles by receiving light having passed through, or reflected or scattered from, the particulate matter particles, and may reconstruct the hologram image based on scattering characteristics of the particulate matter particles.

The apparatus for measuring particulate matter may obtain a Raman spectrum of the particulate matter particles contained in the introduced air (620). For example, when the particulate matter particles are desorbed from the second electrode to be introduced into the waveguide, the apparatus for measuring particulate matter may emit light to the particulate matter particles, and may generate a Raman spectrum of the particulate matter particles by receiving Raman scattered light of the particulate matter particles. In this case, the waveguide may function as a discharge port for the particulate matter particles.

The apparatus for measuring particulate matter may obtain information on the particulate matter particles by analyzing the obtained image and Raman spectrum of the particulate matter particles (630). In this case, the information on the particulate matter particles may include the size, concentration, components, and the like of the particulate matter particles.

In an example embodiment, the apparatus for measuring particulate matter may determine the size and concentration of the particulate matter particles by analyzing the image of the particulate matter particles. For example, by determining the size and number of the particulate matter particles in the image of the particulate matter particles, the apparatus for measuring particulate matter may determine the size and concentration of the particulate matter particles contained in the introduced air.

In an example embodiment, the apparatus for measuring particulate matter may determine the components of the particulate matter particles by analyzing the Raman spectrum of the particulate matter particles. A frequency, at which a Raman spectrum peak appears, may vary depending on the components of the particles. Accordingly, by referring to information on the frequency, at which the Raman spectrum peak appears, for each component of the particles, the apparatus for measuring particulate matter may determine the components of the particulate matter particles. In this case, information on the frequency, at which the Raman spectrum peak appears, for each component of the particles may be derived experimentally, and may be stored in an internal or external memory.

The present disclosure can be realized as a computer-readable code written on a computer-readable recording medium. Codes and code segments needed for realizing the present disclosure can be easily deduced by computer programmers of ordinary skill in the art. The computer-readable recording medium may be any type of recording device in which data is stored in a computer-readable manner. Examples of the computer-readable recording medium include a ROM, a RAM, a CD-ROM, a magnetic tape, a floppy disc, an optical disk, and the like. Further, the computer-readable recording medium can be distributed over a plurality of computer systems connected to a network so that a computer-readable recording medium is written thereto and executed therefrom in a decentralized manner.

While example embodiments have been described with reference to the figures, it will be understood by those of ordinary skill in the art that various changes in form and details may be made therein without departing from the spirit and scope of the present disclosure as defined by the following claims.

What is claimed is:

1. An apparatus for measuring particulate matter, the apparatus comprising:
   an image obtaining device configured to charge particulate matter particles included in air that is introduced to the image obtaining device, and to obtain an image of the charged particulate matter particles based on lens-free imaging;
   a spectrum obtaining device configured to obtain a Raman spectrum of the charged particulate matter particles; and
   a processor configured to determine a size of the particulate matter particles and a concentration of the particulate matter particles based on the obtained image, and to determine components of the particulate matter particles based on the obtained Raman spectrum.

2. The apparatus of claim 1, wherein the image obtaining device comprises:
   a particulate matter adsorbing device configured to charge the particulate matter particles and to adsorb the charged particulate matter particles;
   a light source configured to emit light to the adsorbed particulate matter particles; and
   an image generating device configured to generate an image of the particulate matter particles by receiving light having passed through the adsorbed particulate matter particles, light reflected from the adsorbed particulate matter particles, or light scattered from the adsorbed particulate matter particles.

3. The apparatus of claim 2, wherein the particulate matter adsorbing device comprises:
   a first electrode to which one of a positive polarity or a negative polarity is applied and configured to charge the particulate matter particles; and
   a second electrode to which the other one of the positive polarity and the negative polarity is applied and configured to adsorb the charged particulate matter particles.

4. The apparatus of claim 3, wherein the second electrode has a plate shape.

5. The apparatus of claim 3, wherein the second electrode is formed of one of indium tin oxide (ITO), indium zinc oxide (IZO), stannic oxide (SnO$_2$), zinc oxide (ZnO), graphene, silver nanowire, conductive polymer (e.g., PEDOT: PSS), and carbon nanotube.

6. The apparatus of claim 2, wherein the image generating device comprises at least one of a charge-coupled device (CCD) and a complementary metal oxide semiconductor (CMOS).

7. The apparatus of claim 1, wherein the spectrum obtaining device comprises:
a waveguide into which the charged particulate matter particles are introduced;
a light source configured to emit light to the charged particulate matter particles introduced into the waveguide; and
a spectrum generating device configured to generate the Raman spectrum of the charged particulate matter particles by receiving Raman scattered light of the charged particulate matter particles introduced into the waveguide.

8. The apparatus of claim 7, wherein the spectrum obtaining device further comprises:
a spectrometer configured to separate the Raman scattered light into light of different wavelengths; and
a generating device configured to obtain the Raman spectrum by receiving the Raman scattered light which is separated into the light of different wavelengths.

9. The apparatus of claim 7, wherein the waveguide is configured to discharge the charged particulate matter particles to an outside of the apparatus for measuring particulate matter.

10. The apparatus of claim 7, wherein:
the light source is disposed proximate to an inlet of the waveguide; and
the spectrum generating device is disposed proximate to an outlet of the waveguide.

11. The apparatus of claim 7, wherein the spectrum generating device comprises:
a spectrometer configured to separate the Raman scattered light into light of different wavelengths; and
a generating device configured to obtain the Raman spectrum by receiving the Raman scattered light which is separated into the light of different wavelengths.

12. The apparatus of claim 11, wherein the spectrometer comprises at least one of a prism, a grating, and a filter.

13. The apparatus of claim 11, wherein the generating device comprises at least one of a charge-coupled device (CCD) and a complementary metal oxide semiconductor (CMOS).

14. The apparatus of claim 1, wherein the spectrum obtaining device further comprises a light source configured to emit light to the charged particulate matter particles introduced into the waveguide.

15. A method of measuring particulate matter, the method comprising:
charging particulate matter particles included in air;
obtaining an image of the charged particulate matter particles based on lens-free imaging;
obtaining a Raman spectrum of the charged particulate matter particles;
determining a size of the particulate matter particles and a concentration of the particulate matter particles based on the obtained image; and
determining components of the particulate matter particles based on the obtained Raman spectrum.

16. The method of claim 15, wherein the obtaining of the image comprises:
adsorbing the charged particulate matter particles;
emitting light to the adsorbed particulate matter particles; and
generating an image of the particulate matter particles by receiving light having passed through the adsorbed particulate matter particles, light reflected from the adsorbed particulate matter particles, or light scattered from the adsorbed particulate matter particles.

17. The method of claim 15, wherein the obtaining of the Raman spectrum comprises:
emitting light to the charged particulate matter particles introduced into the waveguide; and
generating a Raman spectrum of the charged particulate matter particles by receiving Raman scattered light of the charged particulate matter particles introduced into the waveguide.

18. An apparatus for measuring particulate matter, the apparatus comprising:
an image obtaining device configured to charge particulate matter particles included in air that is introduced to the image obtaining device, and to obtain an image of the charged particulate matter particles based on lens-free imaging;
a waveguide into which the charged particulate matter particles are introduced;
a spectrum obtaining device configured to obtain a Raman spectrum of the charged particulate matter particles by receiving the Raman scattered light of the charged particulate matter particles introduced into the waveguide; and
a processor configured to determine a size of the particulate matter particles and a concentration of the particulate matter particles based on the obtained image, and to determine components of the particulate matter particles based on the obtained Raman spectrum.

19. The apparatus of claim 18, wherein the image obtaining device comprises:
a particulate matter adsorbing device configured to charge the particulate matter particles and to adsorb the charged particulate matter particles;
a light source configured to emit light to the adsorbed particulate matter particles; and
an image generating device configured to generate an image of the particulate matter particles by receiving light having passed through the adsorbed particulate matter particles, light reflected from the adsorbed particulate matter particles, or light scattered from the adsorbed particulate matter particles.

20. The apparatus of claim 19, wherein the particulate matter adsorbing device comprises:
a first electrode to which one of a positive polarity or a negative polarity is applied and configured to charge the particulate matter particles; and
a second electrode to which the other one of the positive polarity and the negative polarity is applied and configured to adsorb the charged particulate matter particles.

* * * * *